C. O. COZZENS.
EYE PROTECTOR.
APPLICATION FILED MAR. 16, 1920.
1,426,550. Patented Aug. 22, 1922.
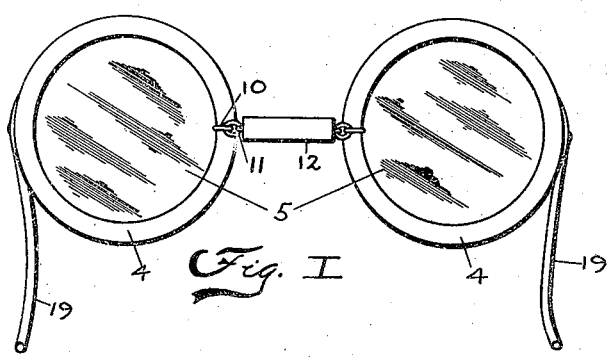
Fig. I
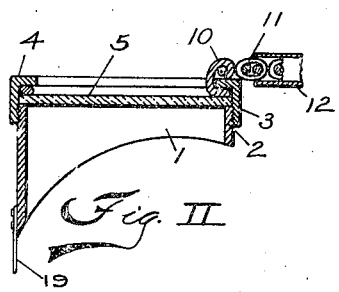
Fig. II
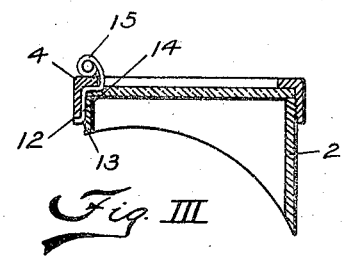
Fig. III
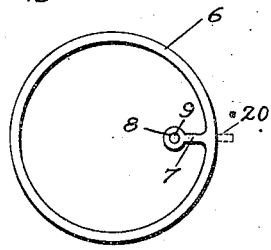
Fig. IV
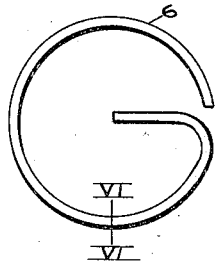
Fig. V
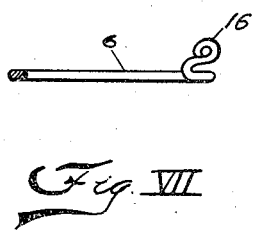
Fig. VII
Fig. VI
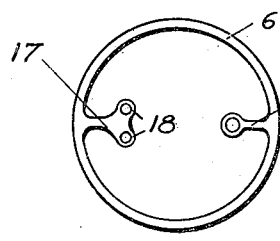
Fig. VIII
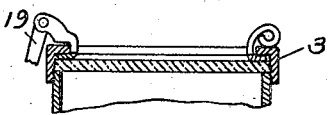
Fig. IX
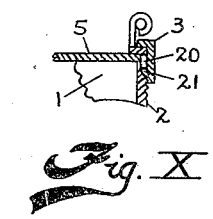
Fig. X
INVENTOR
C. O. COZZENS
BY
H. H. Styll  A. H. Parsons
ATTORNEYS

UNITED STATES PATENT OFFICE.

CHARLES O. COZZENS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

1,426,550.  Specification of Letters Patent.  Patented Aug. 22, 1922.

Application filed March 16, 1920. Serial No. 366,266.

*To all whom it may concern:*

Be it known that I, CHARLES O. COZZENS, a citizen of the United States, residing at Southbridge, in the county of Worcester and State of Massachusetts, have invented certain new and useful Improvements in Eye Protectors, of which the following is a specification.

This invention relates to improvements in devices for the protection of the eye and has particular reference to an improved structure of the goggle type adapted for use in protecting the eye from dirt, flying particles, undue heat or the like.

One of the principal objects of the present invention is the provision of a novel and improved form of connector equally applicable for use in connection with metallic or non-metallic eye cup portions, which shall be detachably associated with such eye cups and which shall be so constructed as to be capable of interchangeable employment in connection with either metal, fiber or other forms of goggles or eye protectors.

A further object of the present invention is the provision of a novel and improved manner of connecting the lens cells of a mounting of this character to permit both of adjustment of the pupillary distance of the mounting and of relative angular adjustment of the eye cups, but which will maintain predetermined pupillary distance or position of the lenses before the eye of the wearer irrespective of the angling adjustment of the parts.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a protector embodying my improvements.

Figure II represents a horizontal sectional view of one embodiment thereof.

Figure III represents a similar view of a different form of construction.

Figure IV represents a plan view of one style of blank for use in the carrying out of my invention.

Figure V represents a plan view of a semi-formed strip of wire for the same purpose.

Figure VI represents a sectional view as on the line VI—VI.

Fig. VII represents a transverse sectional view through the wire member in final formed condition.

Figure VIII represents a plan view of a modified construction of blank.

Figure IX represents a transverse sectional view of a mounting illustrating the structure of Figure VIII in use.

Figure X represents a sectional view of another slight modification of my invention.

In the drawings, in which similar characters of reference are employed to denote corresponding parts throughout the several views, the numeral 1 designates the eye cup members which have been illustrated as formed from heavy composition material and have at their forward portions the outer threaded ends 2 receiving the cap member 3 having the lens retaining flange 4. This flange, it will be noted, is inturned and overhangs the edge of the lens 5, which may be either a plain lens of white or colored glass, may be a specially ground prescription lens, or any other desired special form of lens. It is to be noted that the lens rests against the front of the eye cup while the cap member 3 serves to retain the lens in position.

In connecting mountings of this type there is a certain objection to any metallic fittings passing around or through the walls of the eye cup, due to the fact that this type of goggle is frequently used in the industries in welding or other operations involving intense heat. It has been considered undesirable to make use of metal attachments piercing the eye cup on account of their power to conduct the heat into the interior of the cup and the liability of their coming into contact with the face with unpleasant effects.

One of the purposes, therefore, of my present invention is to provide simple and novel means whereby a metallic fitting may be readily secured to the non-metallic eye cup but in which such fitting may be secured to a metallic eye cup without soldering, riveting or the like, but entirely separate therefrom, which fitting will afford a means of fitting such as end piece, head band or other similar device. One form of my improved construction is illustrated in Figure IV, from which it will be seen that I have provided a disc or rim 6 of the same outside diameter as the lens 5 and which is adapted to be so positioned as to overlie the lens 5 and fit between the lens and the flange 4 of the cap 3 so that screwing of the cap into place on the end of the eye cup 2 will lock in position, both the ring 6 and the lens 5. The ring 6, in that form illustrated in Figure IV, is provided with the lug or prong 7 terminating in an ear 8, which may be either perforated at 9 to form an eye, or may be curled as at 10 for a similar purpose, the idea being that this eye or loop portion affords ready means of attachment of the bridge or connecting member 11. This connecting member I have illustrated in the form of a chain, since this provides an extremely durable yet flexible connection between the parts, and one in which the pupillary distance may be readily temporarily adjusted by giving a twist to the parts, slightly winding up the chain without the necessity of bending any material of the goggle or shortening the connecting member, as has hitherto been necessary. At the same time, to protect the bridge or connecting member 11 from heat as well as to similarly protect the face, I preferably slip thereover the rubber sleeve 12 which extends from eye cup to eye cup and forms a satisfactory coating or protecting member over the metal chain 11.

In connection with Figures II and III, I wish in addition to call particular attention to another improved feature of my present invention. Prior to my invention it has been customary in connecting goggles, eye protectors and the like, of the type here illustrated, to apply the connections intermediately of the width of the cups, the result being that when the goggles were tilted around to fit the face the pivoting point of each goggle was at or near the inner rather than the outer edge and thus any tilting or swinging movement opened up and laterally deflected the optical centers of the lenses, in the case of a prescription goggle. This objectionable feature is obviated by my present connection, in that the connecting members in place of being intermediate the length of the eye cup project forwardly of the eye cup and lens so that any tilting movement is substantially about the front edge of the lens as a center, so that while the rear edges of the cups may come inward the distance between the edges of the lenses and thus between the pupillary centers of the lenses is substantially unvaried, although the inner edges may come in toward the nose.

This structure possesses an additional desirable feature in that the swinging movement being at a point distant from the face slight angling will cause the inner edges of the eye cups to throw inward towards the nose to make a much more satisfactory tight dust proof engagement therewith than is possible with the prior constructions in which the tilt served partially to separate the lenses and only partially to draw the rear end of the eye cups in toward the nose.

In Figure III, I have shown a slight modification of the structure shown in Figure II, in which in place of the complete ring extending around between the end of the nose and eye cup, the eye cup is notched as at 13 to receive the L-shaped member 14 which terminates in the eye 15 projecting upward through the flange 4 but secured in position by screwing of the cap 3 onto the cup 2 as was the ring member 6 previously described.

Figure VI shows a form of constructing the ring member 6 from round wire formed into substantially Figure 6 shape and then subsequently flattened at the end, bent up and into the eye 16, as will be understood by reference to Figure VII, the structure then being ready for insertion beneath the flange 4 either by swinging it into place after the cap has been partially screwed up or by initially placing it in the cap and then securing the latter in place, as may be preferred.

Figures VIII and IX illustrate a slight modification of the structure shown in Figures II and IV, in that the ring member 6 in addition to being provided with the tongue 7 is provided with a second tongue or projection 17 terminating in the pair of end piece ears 18 adapted when bent outward to receive therebetween the temple or head engaging device 19. This ring is secured in position beneath the cap 3 in the manner previously described and provides an outer attachment for a head engaging member and an outer attachment for the eye cup connecting member, thus making a substantially three part cup comprising the cup section proper in engagement with the face, the cap member which screws onto the cup section, and the intermediate ring with its attachments secured in position by tightening of the cap member and affording the necessary center and end piece attaching points entirely exterior to the cup, and without requiring any piercing of the cup for such attachments.

From the foregoing description taken in connection with the accompanying drawings, the construction of my improved goggle or eye protector should be readily understood, and it will be seen that I have provided a protector in which the eye cup is entirely imperforate so far as any attaching devices are concerned, and in which there is no metal or the like extending through the eye cup in the case of a fiber or other cup, and in which no soldering is required in the case of a metal cup, and in which the connections are disposed at the most advantageous point to secure best fitting of the device to the face and minimum disturbance of the desired and predetermined pupillary distance through adjustments of the goggle to the face and consequently a device of extreme efficiency as well as simplicity, In Figure X, I have shown a construction substantially identical with that of Figures II and IV, with the exception that the ring 6 is provided with the tongue 20 adapted to be bent downwardly in the opposite direction from the tongue 7 fitting within the groove 21 of the eye cup member 2. The purpose of this should be readily understood, since it will be seen that ordinarily the ring 6 is rotatable with the cup 3 as the latter is screwed into position so that a little care must be taken to insure the bridge retaining ring being secured in the right position. By the use of the improved tongue or like member, however, this member as at 20 may be inserted in a groove, notch, aperture, or the like, in the cup member 2, and will thus positively lock the ring against rotation and insure the member 10 being in exact correct position while the cap 3 is screwed into position securely locking and holding the parts in place.

I claim:

1. A device of the character described comprising an open ring having a pair of integral inwardly extending tongues formed thereon, one of said tongues terminating in a bridging attaching eye and the other of said tongues terminating in a pair of eyes adapted to be bent to overlie each other and provide a temple-engaging endpiece.

2. A device of the character described including an eye cup and a screw cap therefor and an attaching device in the form of a ring fitting between the cup and cap and having a forwardly projecting attaching tongue.

3. An eye protector including a pair of eye cups having screw caps and connecting means for the cups, including a bridging member and fastening devices for the bridging member having portions extending beneath the cap member whereby tightening of the cap member locks the attaching devices in position.

4. An eye cup construction for an eye protector, comprising a cup having a threaded end, a lens abutting said end, a threaded cap engaged on the end and having a flange overhanging the lens and a brace ring interposed between the flange and lens, said ring having a projecting tongue terminating in a connection engaging eye.

5. An eye protector including an eye cup member, an attaching ring, a cap for securing the attaching ring in position on the cup, and interlocking means on the cup and ring for securing the ring against rotation.

6. A lens securing and connecting member for goggles in the form of a ring having an outwardly deflected tongue terminating in an eye and an inwardly deflected projection for holding the ring against rotation.

In testimony whereof I have affixed my signature, in presence of two witnesses.

CHARLES O. COZZENS.

Witnesses:
E. M. LAFLER,
ALICE G. HASKELL.